United States Patent
Lehman et al.

(10) Patent No.: US 9,963,373 B2
(45) Date of Patent: *May 8, 2018

(54) METHOD OF REDUCING THE OCCURRENCE OF CRYSTALLINE SILICA IN FOAMED GLASS BY THE INTRODUCTION OF CHEMICAL ADDITIVES

(71) Applicant: Earthstone International LLC, Santa Fe, NM (US)

(72) Inventors: Richard L. Lehman, Princeton, NJ (US); Andrew Ungerleider, Santa Fe, NM (US)

(73) Assignee: Earthstone International LLC, Santa Fe, NM (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/488,762

(22) Filed: Sep. 17, 2014

(65) Prior Publication Data

US 2015/0000337 A1    Jan. 1, 2015

Related U.S. Application Data

(63) Continuation-in-part of application No. 12/132,819, filed on Jun. 4, 2008, now Pat. No. 8,916,486, which is a continuation-in-part of application No. 10/848,844, filed on May 19, 2004, now abandoned.

(51) Int. Cl.
*C03B 19/08* (2006.01)
*C03C 11/00* (2006.01)

(52) U.S. Cl.
CPC ............ *C03B 19/08* (2013.01); *C03C 11/007* (2013.01)

(58) Field of Classification Search
CPC ...................................... C03B 19/08
USPC .......................................... 65/22
See application file for complete search history.

(56) References Cited

U.S. PATENT DOCUMENTS

| | | | |
|---|---|---|---|
| 3,744,984 A * | 7/1973 | Sato | ......................... C03B 19/08 501/84 |
| 3,840,380 A | 10/1974 | Kraemer et al. | |
| 3,951,632 A | 4/1976 | Seki et al. | |
| 4,347,326 A * | 8/1982 | Iwami | .................... C03C 11/007 106/602 |
| 4,430,108 A | 2/1984 | Hojaji et al. | |
| 4,853,198 A | 8/1989 | Orii et al. | |
| 4,981,820 A | 1/1991 | Renlund et al. | |
| 5,063,180 A | 11/1991 | Stevens et al. | |
| 5,154,905 A | 10/1992 | Ohshima et al. | |
| 5,179,062 A | 1/1993 | Dufour | |
| 5,180,964 A | 1/1993 | Ewing | |
| 5,516,351 A | 5/1996 | Solomon et al. | |
| 5,525,556 A | 6/1996 | Dunmead et al. | |
| 5,538,674 A | 7/1996 | Nisper et al. | |
| 5,603,887 A | 2/1997 | Eschner | |
| 5,643,843 A | 7/1997 | Dunmead et al. | |
| 5,972,817 A | 10/1999 | Haines et al. | |
| 6,375,735 B1 | 4/2002 | Stephens et al. | |
| 6,409,817 B1 | 6/2002 | Stephens | |
| 6,548,436 B2 | 4/2003 | Rior, Jr. et al. | |
| 2002/0158373 A1 | 10/2002 | Prior, Jr. et al. | |
| 2003/0003041 A1 | 1/2003 | Samuel | |
| 2004/0050100 A1 | 3/2004 | Ungerleider et al. | |
| 2005/0261121 A1 * | 11/2005 | Lehman | ................ C03C 11/007 501/39 |
| 2009/0133440 A1 | 5/2009 | Lehman | |
| 2011/0142902 A1 * | 6/2011 | Jell | ........................ A61K 33/00 424/422 |

FOREIGN PATENT DOCUMENTS

JP          57092546         6/1982

OTHER PUBLICATIONS

Hawley,"Definition of water glass", The Condensed Chemical Disctionary, (1974), p. 810.

* cited by examiner

*Primary Examiner* — Cynthia Szewczyk
(74) *Attorney, Agent, or Firm* — C. John Brannon; Brannon Sowers & Cracraft PC

(57) ABSTRACT

A method of making a foamed glass body, including preparing an admixture of powdered glass, at least one carbonate based foaming agent, and at least devitrification inhibitor, heating the admixture to a first temperature to soften the glass, heating the admixture to a second, higher temperature to foam the softened glass into a foamed glass body, and cooling the foamed glass body, wherein the temperature of the foamed glass body always remains too cold for silica crystal growth. The crystal silica content of the so-formed foamed glass body is less than 1 weight percent.

4 Claims, No Drawings

METHOD OF REDUCING THE OCCURRENCE OF CRYSTALLINE SILICA IN FOAMED GLASS BY THE INTRODUCTION OF CHEMICAL ADDITIVES

CROSS-REFERENCE TO RELATED APPLICATIONS

This patent application is a continuation-in-part or and claims priority to co-pending U.S. patent application Ser. No. 12/132,819, filed on Jun. 4, 2008, which claimed priority to then co-pending U.S. patent application Ser. No. 10/848,844, filed May 19, 2004.

TECHNICAL FIELD

The novel technology relates generally to the field of ceramic materials and, specifically, to a method of making foamed glass while significantly reducing or eliminating crystalline silica from the finished product.

BACKGROUND

Silica is the generic term for minerals and other materials with the chemical formula $SiO_2$. Silica collectively describes crystalline and non-crystalline forms. Crystalline silica (such as quartz, crystobalite, and tridymite) occurs in nature and can also be artificially produced by heating silicate glasses or other amorphous silicates.

Occupational exposure to crystalline silica dust constitutes a serious health hazard. This health hazard is also a concern for consumers using products containing crystalline silica. Silica is found in a large number of consumer products. Spackling patching and taping for drywall construction are formulated from minerals including crystalline silica, and silica flour is added to a multitude of consumer products such as toothpaste, scouring powders, wood fillers, soaps, paints and porcelain. Consumers may be exposed to respirable crystalline silica from such sources as abrasives, sand paper, detergent, cement and grouts. The primary health concerns in those exposed to silica dust are the fibrogenic capacity of the inhaled silica particles that can lead to the development of silicosis as well as an increased risk of tuberculosis. Nationally, the US Occupational Safety and Health Administration (OSHA) and the US National Institute for Occupational Safety and Health (NIOSH) set and regulate inhalation standards for silica dust. Internationally, the International Labour Organization (ILO) and the World Health Organization (WHO) have developed programs to reduce exposure of silica dust in developed and developing countries.

Workers in the foam glass manufacturing sector can be exposed to levels of crystalline silica during production. Consumers using foam glass blocks and powder for surface preparation by sanding, rubbing and/or scraping a surface to clean, abrade and polish such a surface may generate fine dust containing varying percentages of crystalline silica that may subsequently be inhaled. Workers in other industries can likewise be exposed to crystalline silica from foamed glass sources. The building material and insulation industries work with foamed glass in various forms and workers can be exposed in the cutting and handling of products made from foamed glass.

The manufacture of foamed glass includes a heating step that is conducive to transforming part of the amorphous ground glass (silica) into crystalline silica. The thermal profile required for production of foamed glass is often consistent with devitrification of the glass matrix. Crystalline silica, usually in the form of crystobalite, may be a devitrification product. In addition, some of the common foaming agents can accelerate the conversion rate of amorphous to crystalline silica and lower the temperature at which crystal growth occurs.

Crystalline silica is nucleated in vitreous, fused silica and siliceous glasses when the glass melt is cooled through the nucleation temperature range. Silica crystals grow in these glasses in a temperature range that is typically hotter than the nucleation range, although the two may overlap. The result is that during glass production, glass is cooled through the growth temperature range before it enters the nucleation range. Thus, siliceous glasses typically contain a substantial number of silica nuclei that have had little or no time to grow. However, when reheated for softening, such as inherent in the foaming process, these nuclei are thrust back into their growth temperature range and may now grow unchecked into silica crystals. Moreover, the reheating process takes the glass back through the nucleation range on its way to a softening temperature, where even more nuclei may be generated.

Thus, there is a need for a means for preventing or retarding further nucleation and growth of silica crystals in siliceous glass during the foaming process. The present novel technology addresses this need.

SUMMARY

The present novel technology relates to the reduction of crystalline silica in foamed glass. One object of the present application to improve foamed glass products. Related objects and advantages of the present novel technology will be apparent from the following description.

DETAILED DESCRIPTION

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

The present novel technology relates to methods of producing foamed glass having very low concentrations of crystalline silica, such as by chemically retarding the devitrification of silica-based foamed glass by varying its composition, physically retarding the devitrification of silica-based foamed glass by precisely controlling the temperature profile during manufacture, or both. Chemical control is accomplished by the addition of one or more chemicals or compounds to a preparation that is to be used for producing foamed glass to reduce silica crystallization to typically less than 1% by volume. Physical control is accomplished by controlling the cooling rate of the foamed glass to minimize silica crystal nucleation and growth opportunities.

According to one embodiment of the present novel technology, foamed glass is typically produced from a precursor admixture that includes cullet in the form of powdered, ground or otherwise granulated glass or frit, a foaming agent, and a devitrification retarding agent. The glass may be virgin glass, recycled or waste glass, or a mixture thereof. In other words, the foamed glass precursor may be derived from but not limited to pre-consumer manufacturing, post-consumer waste or specifically designed virgin glass. In other embodiments, the precursor may be a glass batch including metal oxide powders (such as soda, lime and silica) with or without glass cullet, a foaming agent and a devitrification retarding agent.

The foaming agent is typically a substance that releases a relatively high volume of typically non-reactive gas upon heating. The remaining material is typically not detrimental to the properties of the glass. Typically, the foaming agent is non-sulfurous. More typically, the foaming agent is a carbonate material. Typically, the foaming agent is present in amounts greater than zero, more typically between about 0.1 and about 20.0 weight percent of the total precursor admixture or batch, and still more typically in amounts between 0.1 and 10 weight percent. Typically, the foaming agent is present in amounts from about 0.5 to about 5.0 weight percent. Commonly used foaming agents include silicon carbonate, barium carbonate, calcium carbonate, magnesium carbonate, sodium carbonate, and mixtures thereof.

The glass precursor admixture is typically powdered or ground, and is typically characterized by, for example, an average particle size distribution that ranges from 1-500 microns. Additional ingredients may be added to the mixture to change the characteristics to benefit the specifically designed finished product. The admixture is typically mixed for homogeneity and then heated to first soften the glass, and then heated more to release the chemically bound gas (typically $CO_2$) from the foaming agent. The sudden release of the bound gas foams the softened glass to produce a porous, cellular foamed glass body, typically characterized by a high degree of interconnected porosity.

Products made of foamed glass or containing foamed glass may include, for example, discs, blocks or powders for preparing surfaces such as by sanding, rubbing and/or scraping the same to clean abrade, polish, smooth or the like. In addition, foamed glass may be made, for example, into various structural and/or building materials such as, but not limited to, agricultural substrates, soil amendments, protective barriers, concrete aggregate, insulation, substrates for composite building panels, runway safety area composites, and the like.

One mechanism leading to silica crystallization begins with heterogeneous nucleation on the material surface. Since the glass precursor material is typically powdered and thus is characterized by a very high surface area to volume ratio, the total surface area of the glass precursor is not inconsiderable. Additives may be used to alter the glass surface chemistry. The presence of highly stable glass-forming additives not prone to nucleation can prevent or inhibit nucleation by the mechanism of inhibited kinetics. Generally, adding more nucleation inhibitors that promote the formation of siliceous compounds reduces silica crystallization and/or growth rates since single component phases crystallize more rapidly. Other additives may be employed to encourage the formation of one or more crystalline silicate phases, each characterized by at least two cation constituents (instead of a pure silica phase). These silicate phases typically are not indicated on regulatory lists subject to control and also typically supersede or preclude the formation of crystalline silica.

A previous manufacturing process reported data indicating cristobalite levels of 10 to 11%. X-ray diffraction analysis (XRD) was used to determine the presence of crystallinity. Semi-quantitative XRD was conducted on small, finely ground samples of foam glass using an automated diffractometer. The level of detection for cristobalite was categorized as approximately 1% (volume basis).

One embodiment of the present novel technology relates to the promotion of surface vitrification by the addition of glass formers to the glass powder prior to foaming. A number of potential devitrification inhibitors (or vitrification enhancers) were experimentally tested. A number of additives, which were successful in the reduction of devitrification of the glass, were less attractive due to their deleterious effect on the foamed glass resulting from the specific glass composition tested. Results showing the effect of the relative amount of devitrification additive on devitrification (as measured by crystal content) were graphed. Theoretical zero points were extrapolated for potential devitrification inhibiting additives. Additives with very shallow graph slopes were eliminated due to the excessively high amounts of additives required to yield the desired devitrification inhibiting effect for that particular glass formulation. A number of devitrification inhibitors were successful in substantially eliminating the growth of cristobalite without otherwise detrimentally affecting the finished product. For example, various additions of chemicals such as, but not limited to, potassium phosphate tribasic, potassium phosphate, sodium phosphate, zinc oxide, and iron oxide may reduce the XRD analysis to the non-detect or 'noise' level for cristobalite. These additives typically substantially retard devitrification when added in amounts comprising less than 20% of the total foamed glass admixture by weight, and, more typically, constitute less than 10% of the preparation that is to be used to produce foam glass.

EXAMPLES

Example 1

To make a foam glass surface preparation product for stripping paint off wood or metal, a mixture of the following substituents was provided:
97.5% (by weight) ground soda/lime/silica glass, −200 mesh
1 wt. % calcium carbonate (foaming agent), −200 mesh
1.5 wt. % zinc oxide (devitrification retarder), −200 mesh The admixture was then appropriately mixed to homogeneity, heated, softened and foamed and the resultant foamed glass body was subsequently annealed. The addition of zinc oxide reduced the cristobalite levels from 6% in a control body formed identically but for the devitrification retarder to below detection limit, or BDL, for the same temperature profile yielding the resulting foam glass product.

Example 2

To make a foam glass surface preparation product for heavy duty household cleaning the following substituents were provided:
94.2% (by weight) ground soda/lime glass, −325 mesh
1% calcium carbonate (foaming agent), −325 mesh
4.8% potassium phosphate tribasic (devitrification retarder), −400 mesh The admixture was homogenized, heated to soften the glass and then further heated to foam the softened glass into a foamed glass body. The foamed glass body was subsequently cooled and analyzed by XRD to reveal that the addition of potassium phosphate tribasic reduced the cristobalite levels from 11% in a control body formed identically but for the devitrification retarder to <1% (BDL).

Example 3

To make a foamed glass substrate for use in a composite building panel the following substituents were provided:
92.6 wt. % ground soda/lime/silica glass, −200 mesh
1.5 wt. % calcium carbonate (foaming agent), −200 mesh
0.5 wt. % magnesium carbonate (foaming agent), −200 mesh
5.4 wt. % sodium phosphate (devitrification retarder), −300 mesh The preparation was homogeneously mixed, heated and foamed, and the resultant foamed glass loaf was analyzed to reveal that the addition of sodium phosphate reduced the cristobalite levels from 8% in a control body formed identically but for the devitrification retarder to <1% (non-detect).

In another embodiment, the occurrence of crystalline silica is reduced by careful control of the temperature profile experienced by the admixture during the softening and foaming process. The admixture is loaded into a mold and the temperature elevated to just under the nucleation temperature for silica in a silica glass mixture. The nucleation temperature range for most silica glasses is between about 670 and about 800 degrees Celsius (or between about 1240 and about 1475 degrees Fahrenheit), so the softening temperature is kept under 670 degrees Celsius, typically below 650 degrees Celsius, more typically between about 600 and 650 degrees Celsius. The admixture is soaked or held at temperature until the entire admixture has attained a substantially homogeneous temperature and the softened particles have flowed together to yield a single, unitary softened glass body. The temperature is then rapidly raised to a sufficient temperature to activate the foaming agent, typically to between about 750 and 825 degrees Celsius (between about 1380 and about 1525 degrees Fahrenheit), with the ramp time being between about 15 and about 25 minutes. The softened glass then foams as gas is released by the foaming agent. The foaming glass body is held at the foaming temperature for between about 1.5 and about 2 hours. The foaming temperature is typically in the silica nucleation range, but below the temperature range at which crystalline silica grows.

After the foaming time has elapsed, the foamed glass body is allowed to cool to room temperature. This may be done via a rapid quench, a slow quench, or very slowly to anneal the foamed glass, depending on the desired end properties of the so-produced foamed glass body.

Example 4

A precursor admixture was prepared as follows:
98.0 wt. % ground soda/lime/silica glass, −200 mesh
1.5 wt. % calcium carbonate (foaming agent), −200 mesh
0.5 wt. % magnesium carbonate (foaming agent), −200 mesh The preparation is homogeneously mixed and loaded into a mold. The mold is then heated to a first softening temperature of 650 degrees Celsius with a ramp time of 1 hour. The mold is then soaked at 650 degrees Celsius for 1.5 hours, and then ramped to a foaming temperature of 795 degrees Celsius and soaked for 1.75 hours. The heat source is then de-energized, and the mold is then allowed to cool in situ to room temperature. The resultant foamed glass loaf is then analyzed to reveal that the cristobalite concentrations were below XRD detections limits, and thus non-detectible (<1%).

Example 5

A precursor admixture may be prepared as follows:
97.5% (by weight) ground soda/lime/silica glass, −200 mesh
1 wt. % calcium carbonate (foaming agent), −200 mesh
1.5 wt. % zinc oxide (devitrification retarder), −200 mesh The preparation is homogeneously mixed and loaded into a mold. The mold is heated to a first softening temperature of 650 degrees Celsius with a ramp time of 1 hour. The mold is then soaked at 600 degrees Celsius for 2.0 hours, and then ramped to a foaming temperature of 775 degrees Celsius and soaked for 2.0 hours. The heat source is then de-energized, and the mold was allowed to cool in situ to room temperature. The resultant foamed glass loaf is then analyzed to reveal that the cristobalite levels were non-detectible (<1%).

In still another embodiment, the occurrence of crystalline silica is reduced by careful control of the temperature profile experienced by the admixture during the softening and foaming process, wherein the admixture includes particulate glass cullet, a foaming agent as defined above, and a devitrifying agent, likewise as defined above. The admixture is loaded into a mold and the temperature elevated to just under the nucleation temperature for silica in a silica glass mixture. The nucleation temperature range for most silica glasses is between about 670 and about 800 degrees Celsius (or between about 1240 and about 1475 degrees Fahrenheit), so the softening temperature is kept under 670 degrees Celsius, typically below 650 degrees Celsius, more typically between about 600 and 650 degrees Celsius. The admixture is soaked or held at temperature until the entire admixture has attained a substantially homogeneous temperature and the softened particles have flowed together to yield a single, unitary softened glass body. The temperature is then rapidly raised to a sufficient temperature to activate the foaming agent, typically to between about 750 and 825 degrees Celsius (between about 1380 and about 1525 degrees Fahrenheit), with the ramp time being between about 15 and about 25 minutes. The softened glass then foams as gas is released by the foaming agent. The foaming glass body is held at the foaming temperature for between about 1.5 and about 2 hours. The foaming temperature is typically in the silica nucleation range, but below the temperature range at which crystalline silica grows.

After the foaming time has elapsed, the foamed glass body is allowed to cool to room temperature. This may be done via a rapid quench, a slow quench, or very slowly to anneal the foamed glass, depending on the desired end properties of the so-produced foamed glass body.

Example 6

A foamed glass block may be produced from the following admixture:
92.6 wt. % ground soda/lime/silica glass, −200 mesh
1.5 wt. % calcium carbonate (foaming agent), −200 mesh
0.5 wt. % magnesium carbonate (foaming agent), −200 mesh
5.4 wt. % sodium phosphate (devitrification retarder), −300 mesh The preparation is homogeneously mixed and loaded into a mold. The mold may be heated to a first softening temperature of 650 degrees Celsius with a ramp time of 1 hour. The mold may be soaked at 600 degrees Celsius for 2.0 hours, and then ramped to a foaming temperature of 775 degrees Celsius and soaked for 2.0 hours. The heat source is then de-energized, and the mold was allowed to cool in situ to room temperature. The resultant foamed glass loaf may be analyzed to reveal that the cristobalite levels are non-detectible (<1%).

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method of making a foamed glass article, comprising:
   mixing powdered glass, at least one carbonate based foaming agent, and at least one vitrification enhancer to define an admixture having a first composition;
   heating the admixture to a first dilatometric softening temperature, wherein the first dilatometric softening temperature is too cold for silica crystal nucleation and for silica crystal growth;
   soaking the heated admixture at about the first dilatometric softening temperature;
   heating the admixture to a second, higher foaming temperature, wherein the second, higher foaming temperature is too cold for silica crystal growth in the first composition;
   foaming the admixture to yield a foamed glass body; and
   cooling the foamed glass body to below the dilatometric softening temperature;
   wherein the vitrification enhancer is iron oxide;
   wherein the vitrification enhancer inhibits surface nucleation of silica on silicate glass particles.

2. The method of claim 1 wherein the foamed glass body contains less than about 1 weight percent crystalline silica.

3. The method of claim 1 wherein the foamed glass body has a cristobalite content below the XRD detection limit.

4. The method of claim 1 wherein the foamed glass body has a zero crystalline silica content.

* * * * *